Jan. 16, 1923.
L. A. SWEET.
HOOD CLAMP.
FILED DEC. 13, 1920.
1,442,369.
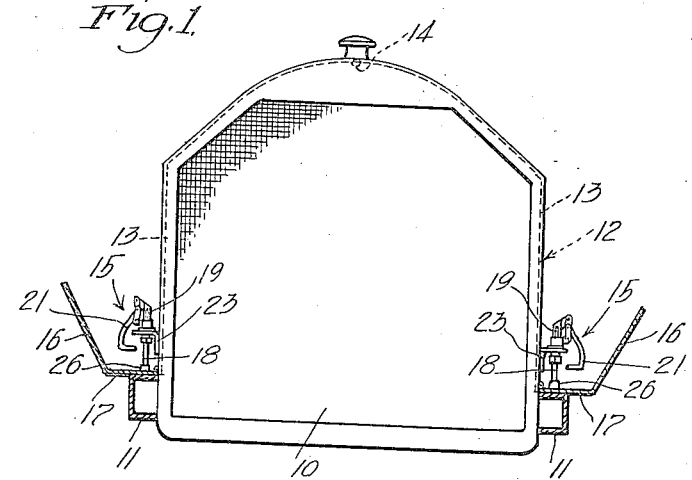
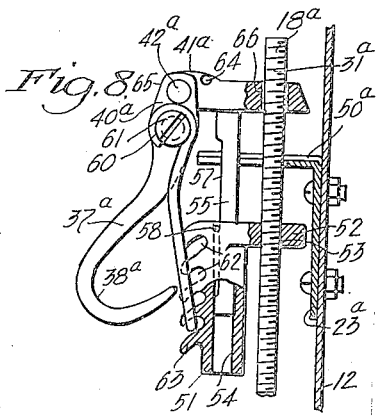
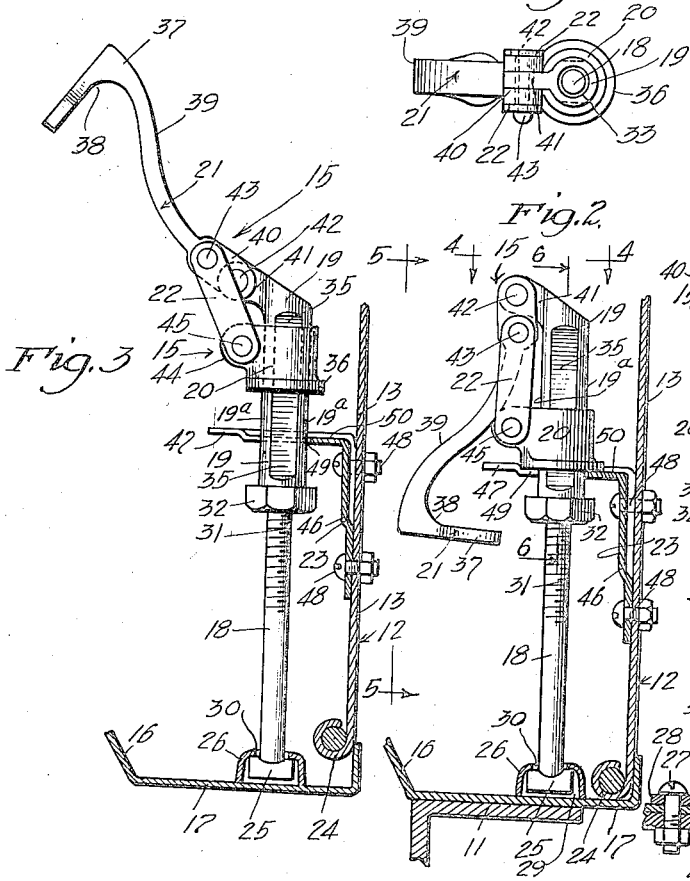
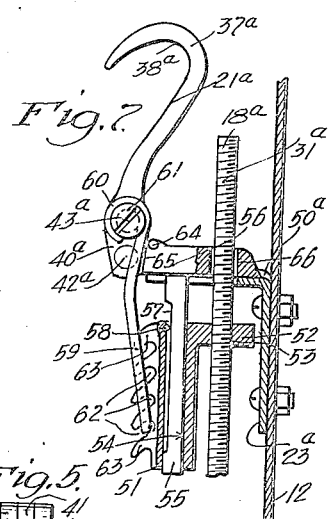
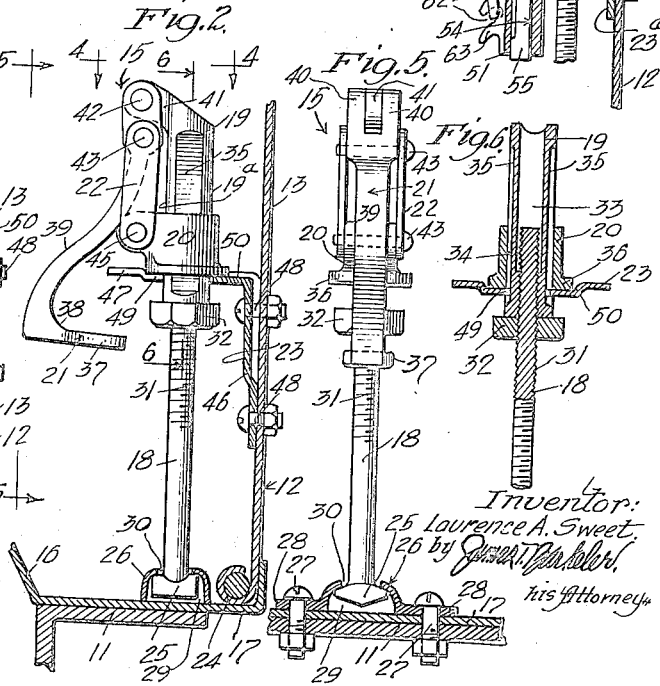
Inventor:
Laurence A. Sweet,
by [signature]
his Attorney Patented Jan. 16, 1923.

1,442,369

UNITED STATES PATENT OFFICE.

LAURENCE A. SWEET, OF LOS ANGELES, CALIFORNIA.

HOOD CLAMP.

Application filed December 13, 1920. Serial No. 430,402.

*To all whom it may concern:*

Be it known that I, LAURENCE A. SWEET, a citizen of the United States, residing at Los Angeles, in the county of Los Angeles and State of California, have invented a new and useful Improvement in Hood Clamps, and the following is such a full, clear, and exact disclosure of the manner of constructing and using the device that anyone skilled in the art to which it appertains may make and use the same.

My invention pertains primarily to clamps, and particularly to a clamp adapted for use in connection with motor vehicles, and the like, to securely hold the engine hood down and prevent rattling.

Specifically my invention comprises a means for accomplishing the aforementioned purpose, which is durable, inexpensive to manufacture, and which may be easily and quickly applied to any standard make of motor vehicle.

My principal object in perfecting the the present invention was to provide a device of this character, embodying, among other features, a principle of leverage whereby a maximum of force can be applied to the hood, to hold it securely in place, with a minimum of physical exertion.

A further object is the inclusion of certain structural features which make the device adjustable, thereby providing a take-up means to compensate for looseness, due to wear and the consequent misfit of the parts involved.

In the preferred form of my device I have eliminated the springs commonly used heretofore in devices of this nature, first, for the purpose of overcoming the usual difficulties attendant upon their use; and, second, to obviate the possibility of the clamp becoming loose and rattly, which condition generally results from clamps depending upon springs to maintain their holding force.

The most common difficulty experienced in the use of clamps embodying springs in their construction is that the clamps, being mounted on the vehicle frame intermediate the fenders and the hood, are more or less inaccessible; and are, therefore, not easily operated against the necessarily strong tension of their holding springs, without leaning against the fenders, these being generally dirty and dusty and resulting in soiling one's clothing. Another objection is that, owing to the fact that the springs are usually very strong, which must of necessity be the case to accomplish the desired results, care must be taken to avoid pinching or bruising the hand, between the clamp and the hood, when operating them.

I believe I have successfully overcome these aforementioned objectionable features in the construction I have incorporated in my device, the details of which will be fully disclosed in the following specification, reference being made therein to the accompanying drawings, in which—

Fig. 1 is a fragmentary front elevation of a motor vehicle, showing the radiator mounted between the frame sections, with fragments of the wheel fenders thereon, and showing my invention as applied thereto; Fig. 2 is a side elevation of my improved clamp, parts being shown in section, and showing its attachment on the vehicle in clamped position; Fig. 3 is a view similar to Fig. 2, only showing the device in unclamped or released position; Fig. 4 is a plan view of the device, taken as indicated by the line 4—4 on Fig. 2; Fig. 5 is an elevation of the same, taken as indicated by the line 5—5 of Fig. 2; Fig. 6 is a transverse vertical section taken as indicated by the line 6—6 of Fig. 2; Fig. 7 is a view similar to Fig. 2, only showing a modified form of my device; Fig. 8 is a view similar to Fig. 7, showing the modified form of the device in its unclamped position, similar to that illustrated in Fig. 3.

Referring now particularly to Figs. 1 to 6, inclusive, the numeral 10 designates a typical motor vehicle radiator, suitably supported in any manner between the longitudinal side frame members 11; the motor cover 12, commonly termed the "hood", being supported at one end upon the radiator 10, the opposite end being supported upon the vehicle body, or on the outer face of the cowl, in the customary manner. A typical hood 12 is generally constructed of two parts 13, to extend over the motor in a plane with the outline of that portion of the radiator extending above the top edges of the frame members 11; these two side portions 13 being centrally hinged together upon a common supporting rod 14, one end of which is supported upon the radiator and the opposite end upon the vehicle body.

With this construction, one side of the hood may be raised independently of the other; and my invention is designed to hold the portions 13 securely down and in place upon their supports, in a manner to be easily and quickly released or secured.

My improved clamp, generally designated in the drawings by the numeral 15, is adapted to be mounted on the frame members 11, immediately adjacent the bottom edges of the portions 13 of the hood 12, and when down between the wheel fenders 16 and the said portions 13. The wheel fenders 16 generally have a portion 17 extending over the frame members 11, by which they are usually secured to these members; in which case, my device will be mounted on top of the portions 17, its fastening means extending through these portions and into the frame members 11. From the disclosure to be hereafter made, it will be noted that, although my device is mounted upon the vehicle frame intermediate the fenders 16 and the hood portions 13, nevertheless, owing to its particular type of construction, it can be very easily and conveniently operated.

The preferred form of my clamp comprises essentially a supporting rod 18, upon which is adjustably mounted a bearing sleeve 19, having a clamping member 20 slidably mounted thereon, the latter being actuated through the medium of a hand lever 21 connected thereto by means of connecting links 22. In performing its clamping function the clamp member 20 is adapted to engage a clamp bracket 23, rigidly secured to the hood member 13 adjacent its bottom edge 24.

The supporting rod 18 has an enlarged end 25, preferably formed integral therewith, by means of which it is pivotally mounted on the vehicle frame. The enlarged end 25 is retained within a socket member 26, rigidly mounted on the frame members 11 by means of bolts 27, passing through apertures in ears 28. The socket member 26 may be formed of light steel, or other suitable material, and is pressed out to form the socket 29, in which the end 25 is retained; the rod 18 extending through an aperture 30, in the top thereof, as clearly shown in Figs. 2, 3 and 5. The top surface of the end 25 is preferably curved, the lower surfaces thereof being angular and converging downwardly towards the center (see Fig. 5); these angular surfaces being adapted to contact with the frame member to form a support whereby the rod 18 will be permitted a certain latitude of pivotal movement, and at the same time be retained in a nearly upright position when not in locked engagement with the bracket 23. While this type of construction is preferred, it is nevertheless obvious that any type of ball and socket joint may be provided for suitably mounting the rod 18 on the frame members.

The upper end of the rod 18 is screw-threaded, as at 31, by means of which the sleeve bearing 19 is adjustably mounted thereon; the latter being internally screw-threaded adjacent its lower end (see Fig. 6) to engage the threads 31. A lock nut 32 is provided on the rod 18, below the bearing sleeve 19, to lock the latter in its adjusted position.

The bearing sleeve 19 is preferably cylindrical, and has an axial bore 33, above its internally screw-threaded portion, through which the rod 18 is adapted to extend in its various adjustments; the sleeve, as a whole, being of any length suitable to accomplish the desired results.

The clamp member 20 hereinafter termed the clamping collar, is preferably cylindrical and has a central bore 34 adapted to slidingly engage the periphery of the bearing sleeve 19. The sleeve 19 is cut away or flattened, as at 35, leaving arcuate diametrically opposed bearing surfaces 19$^a$ with which the surface of the bore 34 engages to permit the sliding movement of the clamp member 20. It also has an annular flange 36 around its lower end, thereby providing an adequate surface to engage the bracket 23.

As hereinbefore stated, the clamping collar 20 is slidingly reciprocated on the bearing sleeve 19 by means of the lever 21 and the links 22. The lever 21 is preferably of the configuration shown in Figs. 2, 3 and 5, having a hooked portion 37, formed at its distal end, the bight 38 of which is adapted to be engaged by the fingers or finger to release the clamp, as will be more fully hereinafter explained; and providing a curved surface 39, to be likewise engaged, in the clamping operation. The opposite end of the lever 21 is bifurcated, as at 40, for the reception of a radial lug 41, formed on the sleeve 19; the lug 41 and the bifurcations 40 being co-axially bored for the reception of a pin 42, forming a pivotal center about which the lever 21 turns. The pivot pin 42 is preferably countersunk in the outer faces of the bifurcations 40 and the ends riveted over and made flush with the outer faces thereof, so as not to interfere with the movement of the links 22.

The links 22 extend on either side of the lever 21, being pivotally connected thereto at a point a short distance from its proximal end, (intermediate this end and its distal end), by means of a pin 43. The opposite ends of the links extend on either side of a radially disposed lug 44, formed integral with the clamping collar 20, being retained in pivotal engagement therewith by means of a pin 45. The pins 42, 43 and 45 are so positioned in alignment that when the device is in clamping position, as shown in Fig. 2, and the lever 21 is abutting against the lug 44, limiting its downward movement, the pin 43 will be aligned slightly off-center, or slightly beyond a line drawn through the centers of pins 42 and 45, thereby insuring its remaining in locked position, due to a pressurable contact between the clamp sleeve 20 and the bracket 23. This construction is in operation and effect a toggle mechanism.

The bracket 23 may be formed of sheet metal, or a cast metal, if desired, the former being preferred, however, as it will afford a slight resilience which will assist in the clamping operation. These brackets are angular, as shown in Figs. 2 and 3, having a supporting arm 46 and a clamping arm 47. They are supported on the hood members 12 by means of bolts 48, extending through the clamping arm 46, or in any other suitable manner. The clamping arm 47 is slotted inwardly from its outer edge as at 49, for the reception of the bearing sleeve 19. The slot 49, is preferably of a width slightly less than the diameter of the sleeve 19, and the latter is flattened, as at 35, on diametrically opposite sides, so the lateral edges as of the slot 49 will engage these surfaces and prevent the sleeve from turning, as clearly shown in Fig. 6. The clamping arm 47 may be rebated or slightly dished, to form a seat 50 for the clamping sleeve 20 which will prevent accidental displacement of the clamping device if it should become a little loose. It is to be understood that this particular form of bracket 23 is merely typical of that which may be employed and that it is not necessary that the clamping member and bracket cooperate in the specific manner herein set forth as they might well be modified to cooperate in other manners; for instance, they might be modified to cooperate or engage each other with more or less of a hooking action.

In operation (the preferred form of my device as shown in Figs. 2, 3 and 5) when in unclamped position, the arm 21 is raised, thereby raising the clamping collar 20 upwardly on the bearing sleeve 19, and out of engagement with the clamping bracket 23 (see Fig. 3). When the collar 20 is raised out of engagement with this bracket the supporting rod 18 is free to pivot in the socket member 26, thereby permitting its removal from the slot 49, and permitting the hood section 12 to be raised. To effect its locking engagement, the rod 18, pivoting in the socket member 26, is manually moved into position so the bearing sleeve 19 can be slipped in the slot 49, after which the lever 21 is pushed downwardly (from the position shown in Fig. 3 to the position shown in Fig. 2), which brings the collar 20 down and into engagement with the seat 50 in the arm 47, thereby forcing the lower end 24 of the hood section 12 into engagement with fender section 17, and clamping it tightly in that position. In being forced into clamping position the lever 21 is pushed down until it abuts against the lug 44, on the collar 20, at which time the pin 43 has passed beyond the center line passing through the pins 42 and 45, and thus being past center, the upward pressure against the collar 20 will securely hold the device in locked position. The lower end 24 of hood section 12 need not necessarily contact with the fender section 17 when in locked position, in order to prevent rattling, as the device is capable of exerting a sufficient pressure on the bracket 23 to hold the hood securely down on its upper supports.

In the modified form shown in Figs. 7 and 8, the supporting rod $18^a$, having its upper end screw-threaded at $31^a$, is typical of the supporting rod 18, shown in the other figures of the drawing. A cylindrical adjusting member 51 has an outwardly extending lug 52, formed integral with its upper end, in which is an internally screw-threaded bore 53, by means of which the member 51 is adjustably mounted on the rod $18^a$. The member 51 has an axial bore 54 in which a rod 55 is slidably mounted; the rod 55 having a clamping head 56 on its upper end and preferably formed integral therewith. One side of the rod 55 is flattened intermediate its ends, as at 57, and a small pin 58 extending through the member 51, within the bore 54, is adapted to engage the face 57 to prevent the pin 55 from becoming removed from the bore 54 and also from turning therein.

A lever $21^a$ is likewise pivotally mounted on the head 56, having a bifurcated end $40^a$, adapted to engage a lug $41^a$, preferably formed integral with the head 56, the two being retained in pivotal engagement by means of pivot pin $42^a$. The lever $21^a$ likewise has a hook portion $37^a$ at its distal end, forming a bight $38^a$ to be engaged by the fingers for actuating the same.

A U-shaped wire loop 59 is pivotally supported on the lever $21^a$ by means of a pin $43^a$ extending through eyes 60 formed in the outer ends of its arms. The pin $43^a$ has enlarged heads 61 on either end for retaining the eyes 60 thereon; and it is positioned on the lever $21^a$ a short distance from the pivot pin $42^a$, and intermediate its proxim and distal ends. The bight of the loop 59 is adapted to engage anyone of a plurality of notches 62 formed between teeth 63 on the side of the member 51, to afford adjustability to the position of the clamping head 56, when in clamped position.

It will be noted in the modified form of my device that the position of the actuating lever $21^a$ is just the opposite from that shown in the preferred form; that is, it extends upwardly when the device is in clamped position, instead of downwardly as in Fig. 2. For this reason a pin 64 extends through the clamping head 56, and is adapted to be engaged by the faces 65, of the lever 21ª, to limit its movement in clamping position. It will be further noted that this pin is so positioned that, when in clamped position, the lever 21ª will be stopped so that the pin 43ª will be beyond a line passing through the centers of the pin 42ª and the bight of the loop 59 at the point of its engagement with one of the notches 52. This is similar to the principle set forth in connection with the preferred form of the device, to prevent accidental disengagement of the clamping head 56 from the bracket 23ª, when in clamped position. The clamping head 56 is likewise adapted to seat in a depression 50ª in the bracket 23ª to securely hold the hood section 12 down.

In the operation of the modified form of my device, the member 51 is adjustably positioned on the rod 18ª to the desired height to effect a clamping engagement between the head 56 and the bracket 23ª. The lever 21ª is then thrown down to the position shown in Fig. 8, and the bight of the loop 59 passed into one of the notches 52, in the member 51, and the rods 18ª and 55 then passed into the slot 49ª of the bracket 23ª, after which the lever 21 is raised up to the position shown in Fig. 7. In raising the lever 21ª it will turn about the pin 43ª, in the eyes 60, as a pivot, its proximal end, through the pin 42ª, forcing the head 56 down and into engagement with the bracket 23ª, the rod 55 sliding in the bore 54 during this movement. The head 56 has a bore 66, parallel to the axis of the rod 55, through which the rod 18ª extends when its adjustment makes this necessary in effecting the clamping arrangement. To release the hood, it is only necessary to pull the lever 21ª downwardly from the position shown in Fig. 7, to that shown in Fig. 8, which movement will release the head 56 from pressurable clamping engagement with the bracket 53ª, after which the device, pivoting on the lower end of the rod 18ª, can be withdrawn from the slot 49ª.

While I have here shown and described a preferred embodiment of my device, it is nevertheless to be understood that I reserve the right to make any changes in modification or structure which properly come within the scope of the appended claims.

Having described a preferred form of my invention, I claim:

1. A device of the character described comprising a supporting rod, a relatively movable clamping member slidably mounted on the rod and lever means to actuate the clamping member.

2. A device of the character described comprising a supporting rod, a relatively slidable clamping member adjustably mounted on the rod and lever means to actuate the clamping member.

3. A device of the character described comprising a clamping bracket, a supporting rod, a relatively slidable clamping member adjustably mounted on the rod and adapted to engage the clamping bracket, and positive means to actuate the clamping member to effect its engagement and disengagement with the bracket.

4. A device of the character described comprising a clamping bracket, a supporting rod, a relatively slidable clamping member adjustably mounted on the rod and adapted to engage the clamping bracket, and a toggle mechanism to actuate the clamping member to effect its engagement and disengagement with the bracket.

5. A device of the character described, comprising a supporting rod, a bearing sleeve mounted on the upper end of the rod, a relatively movable clamping member slidably mounted on the bearing sleeve, and means to control the movement of the clamping member.

6. A device of the character described, comprising a supporting rod, a bearing sleeve adjustably mounted on the upper end of the rod, a relatively movable clamping member slidably mounted on the bearing sleeve, and positive means to control the movement of the clamping member.

7. A device of the character described, comprising a supporting rod, a bearing sleeve mounted on the upper end of the rod, a relatively movable clamping member slidably mounted on the bearing sleeve, and a toggle mechanism to control the movement of the clamping member.

8. A device of the character described, comprising a clamping bracket, a supporting rod, a bearing sleeve mounted on the upper end of the rod, a relative movable clamping member slidably mounted on the bearing sleeve and adapted to engage the clamping bracket, and means to control the movement of the clamping member to effect its engagement and disengagement with the clamping bracket.

9. A device of the character described comprising a clamping bracket, a supporting rod, a bearing sleeve adjustably mounted on the upper end of the rod, a relatively movable clamping member slidably mounted on the bearing sleeve and adapted to engage the clamping bracket, and means in connection with the bearing sleeve and the clamping member to control the movement of the clamping member to effect its engagement and disengagement with the clamping bracket.

10. A device of the character described, comprising a clamping bracket, a supporting rod, a bearing sleeve mounted on the upper end of the rod, a relatively movable clamping member slidably mounted on the bearing sleeve and adapted to engage the clamping bracket, and a positive manually operable toggle mechanism to control the movement of the clamping member to effect its engagement and disengagement with the clamping bracket.

11. A device of the character described comprising a clamping bracket, a pivoted supporting rod, a bearing sleeve adjustably mounted on the upper end of the rod, a relatively movable clamping member slidably mounted on the bearing sleeve and adapted to engage the clamping bracket, and lever means to control the movement of the clamping member to effect its engagement and disengagement with the clamping bracket.

12. The combination with a motor vehicle having a motor hood and frame members, of a hood clamp comprising, a clamping bracket secured to the hood, a supporting rod swivelly secured at its lower end to one of the frame members adjacent the hood, a bearing sleeve adjustably mounted on the upper end of the rod, a relatively movable clamping collar slidably mounted on the bearing sleeve and adapted to engage the clamping bracket on the hood, a manually operable lever pivotally mounted on the upper end of the bearing sleeve and a connecting link operatively connecting the lever with the clamping collar to effect its engagement and disengagement with the clamping bracket.

13. A hood clamp comprising a supporting rod, a bearing sleeve on the upper end of the rod, a relatively movable clamping collar slidably mounted on the bearing sleeve, a lever pivotally mounted on the bearing sleeve, and a link operatively connecting the said lever and collar.

14. A hood clamp comprising a supporting rod, a bearing sleeve adjustably mounted on the upper end of the rod, a relatively movable clamping collar slidably mounted on the bearing sleeve, a lever pivotally mounted on the bearing sleeve, and a link operatively connecting the said lever and collar.

15. A hood clamp for motor vehicles comprising a supporting rod pivotally mounted at its lower end on the vehicle frame, a bearing sleeve adjustably mounted on the upper end of the rod, a relatively movable clamping collar slidably mounted on the bearing sleeve, and a manually operable toggle mechanism for actuating the clamping collar.

16. A hood clamp for motor vehicles comprising, a clamping bracket secured to the vehicle hood, a supporting rod pivotally mounted on the vehicle frame, a bearing sleeve adjustably mounted on the upper end of the supporting rod, a relatively movably clamping collar slidably mounted on the bearing sleeve and adapted to engage the clamping bracket, and a manually operable toggle mechanism mounted on the sleeve and operatively connected to the clamping collar to effect the engagement and disengagement of the said collar with the bracket.

17. A hood clamp for motor vehicles comprising, a clamping bracket secured to the vehicle hood, a supporting rod pivotally mounted on the vehicle frame, a bearing sleeve adjustably mounted on the upper end of the supporting rod, a relatively movable clamping collar slidably mounted on the bearing sleeve and adapted to engage the clamping bracket, a manually operable toggle mechanism mounted on the sleeve and operatively connected to the clamping collar to effect the engagement and disengagement of the said collar with the bracket, the bracket and bearing sleeve cooperating to prevent turning of the latter.

18. A hood clamp for motor vehicles comprising, a clamping bracket having an open ended slot secured to the vehicle hood, a supporting rod pivotally mounted at its lower end on the vehicle frame, a bearing sleeve on the upper end of the rod adapted to be inserted in the said slot, a relatively movable clamping collar slidably mounted on the bearing sleeve and adapted to engage the bracket on either side of the said slot when the sleeve is inserted therein, and a manually operable toggle mechanism for actuating the clamping collar to effect its engagement and disengagement with the bracket.

19. A hood clamp for motor vehicles comprising, a clamping bracket having an open ended slot secured to the vehicle hood, a supporting rod pivotally mounted at its lower end on the vehicle frame, a bearing sleeve adjustably mounted on the upper end of the rod adapted to be inserted in the said slot, a relatively movable clamping collar slidably mounted on the bearing sleeve and adapted to engage the bracket on either side of the said slot when the sleeve is inserted therein, and a manually operable toggle mechanism for actuating the clamping collar to effect its engagement and disengagement with the bracket.

20. A hood clamp for motor vehicles comprising, a clamping bracket having an open ended slot secured to the vehicle hood, a supporting rod pivotally mounted at its lower end on the vehicle frame, a bearing sleeve adjustably mounted on the upper end of the rod adapted to be inserted in the said slot, a relatively movable clamping collar slidably mounted on the bearing sleeve and adapted to engage the bracket on either side of the said slot when the sleeve is inserted therein, and a manually operable toggle mechanism for actuating the clamping collar to effect its engagement and disengagement with the bracket, the bracket and bearing sleeve cooperating to prevent turning of the latter.

21. A hood clamp for motor vehicles comprising a supporting rod a bearing sleeve mounted on the upper end of said rod, a relatively movable clamping collar slidably mounted on the bearing sleeve, a lever pivotally mounted on the upper end of said sleeve and a link operatively connected at one end to the collar and at the opposite end to the lever, the said last mentioned connection being positioned intermediate the pivotal point and distal end of the lever.

22. A hood clamp for motor vehicles comprising, a clamping bracket having an open ended slot secured to the vehicle hood, a supporting rod pivotally mounted at its lower end on the vehicle frame, a bearing sleeve adjustably mounted on the upper end of the rod and adapted to be inserted in the said slot a relatively movable clamping collar slidably mounted on the bearing sleeve and adapted to engage the bracket on either side of the said slot when the sleeve is inserted therein, a manually operable lever pivotally mounted on the upper end of the bearing sleeve and a link operatively connecting the said lever and collar, the link connection on the lever being positioned intermediate its pivotal point and operative end so that when the lever is in clamping position the said connection will be beyond a line drawn through the pivotal point of the lever and the link connection on the collar.

23. A hood clamp for motor vehicles comprising, a clamping bracket having an open ended slot secured to the vehicle hood, a supporting rod pivotally mounted at its lower end on the vehicle frame, a bearing sleeve adjustably mounted on the upper end of the rod and adapted to be inserted in the said slot, the said slot and sleeve cooperating to prevent turning of the latter on the rod, a relatively movable clamping collar slidably mounted on the bearing sleeve and adapted to engage the bracket on either side of the said slot when the sleeve is inserted therein, a manually operable lever pivotally mounted on the upper end of the bearing sleeve and a link operatively connecting the said lever and collar, the link connection on the lever being positioned intermediate its pivotal point and operative end so that when the lever is in clamping position the said connection will be beyond a line drawn through the pivotal point of the lever and the link connection on the collar.

In witness that I claim the foregoing I have hereunto subscribed my name this 7th day of December, 1920.

LAURENCE A. SWEET.